H. F. KRANTZ.

SWITCH MECHANISM.

APPLICATION FILED APR. 30, 1919.

Reissued July 12, 1921.

15,152.

2 SHEETS—SHEET 1.

WITNESSES:

J. A. Helsel.

J. A. Porter

INVENTOR

Hubert F. Krantz

BY

Wesley G. Carr

ATTORNEY

H. F. KRANTZ.

SWITCH MECHANISM.

APPLICATION FILED APR. 30, 1919.

Reissued July 12, 1921.

15,152.

2 SHEETS—SHEET 2.

WITNESSES:

H. T. Shelhamer

J. A. Procter

INVENTOR

Hubert F. Krantz

BY

Wesley G. Carr

ATTORNEY

UNITED STATES PATENT OFFICE.

HUBERT F. KRANTZ, OF BROOKLYN, NEW YORK, ASSIGNOR TO KRANTZ MANUFACTURING COMPANY, INC., OF BROOKLYN, NEW YORK, A CORPORATION OF NEW YORK.

SWITCH MECHANISM.

15,152. Specification of Reissued Letters Patent. Reissued July 12, 1921.

Original No. 1,256,332, dated February 12, 1918, Serial No. 836,423, filed May 5, 1914. Application for reissue filed April 30, 1919. Serial No. 293,857.

*To all whom it may concern:*

Be it known that I, HUBERT F. KRANTZ, a citizen of the United States, residing at Brooklyn, county of Kings, city and State of New York, have invented certain new and useful Improvements in Switch Mechanism, of which the following is a clear, full, and exact description.

This invention relates to an improved electric switch mechanism for use with either a push button, lever throw or pull switch, particularly of the quick-make and quick-break type.

It is the object of the invention to make a switch of this character in which the user upon breaking contact and up to the time of actual break will necessarily increase the pressure on the contacting parts, and in which the contact, when once made, will be maintained by resilient pressure on the part of the operating means. I prefer to use a switch blade which is inherently resilient itself in accomplishing the purpose set forth.

A more detailed object of the invention is to provide a quick-break mechanism made up of spring parts movable through a "dead center" position to reverse the effect of said spring parts from a force tending to "on" position to a force tending to "off" position, and to provide a contact member of such a nature, and so connected as to serve in part to effectually prevent the spring parts from standing in the "dead center" position.

The scope of my invention will be set forth in the claims.

Figure 1:
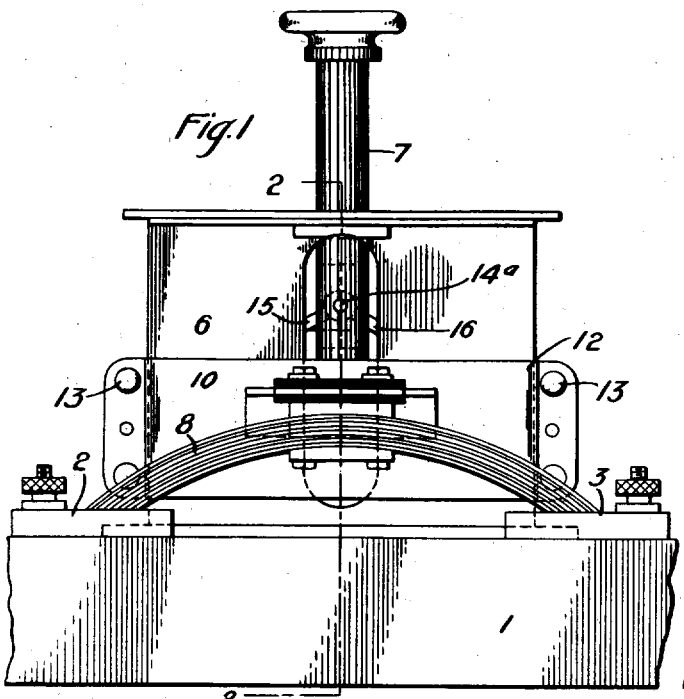
Figure 1 is a side elevation of a pull form of my improved switch.
Figure 2:
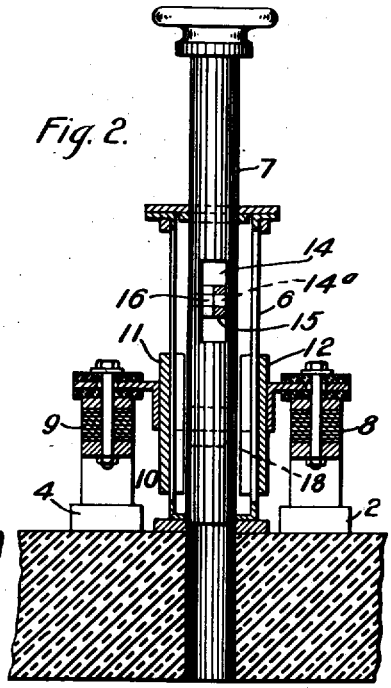
Fig. 2 is a section on line 2—2 Fig. 1.

In the drawings: Figs. 1 to 4, I have illustrated my invention as applied to a pull switch.

The base plate 1 has a terminal device consisting of four flat contact plates 2, 3, 4 and 5 to which supply conductors and branch circuit conductors are connected.

Figure 3:
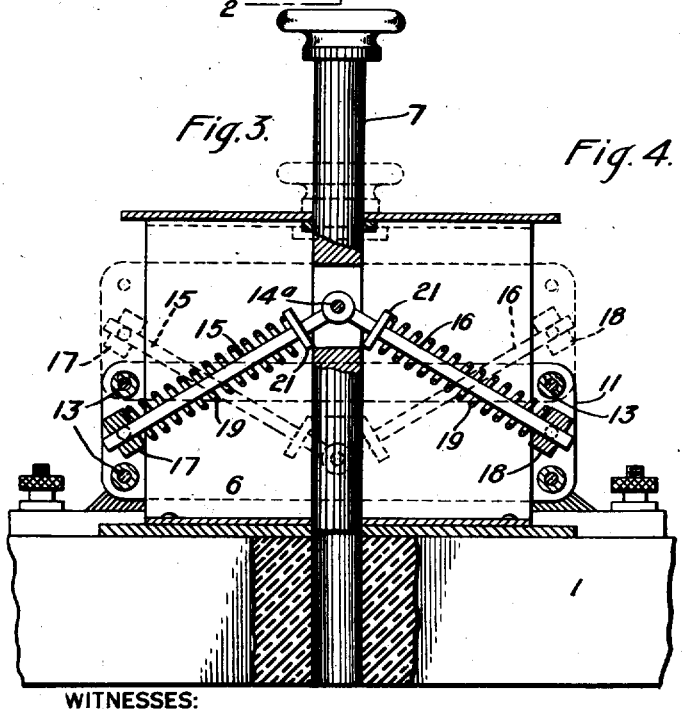
Fig. 3 is a section on line 4—4 of Fig. 4.
Figure 4:
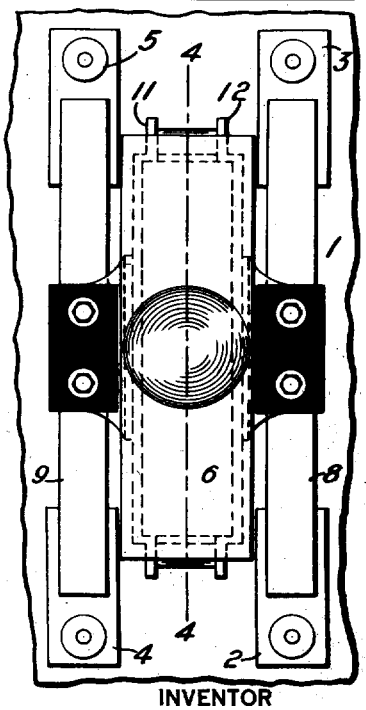
Fig. 4 is a plan of Fig. 1.

A casing 6 guides an operating rod 7 which may be reciprocated from the position shown in full lines, Fig. 3 to that shown in dotted lines. Contact blades 8 and 9 carried by a reciprocatory carrier 10, and of the inherently resilient or brush type are adapted to contact with the terminal plates.

The carrier 10 surrounds and is guided upon the casing 6, and consists of side plates 11 and 12 secured by end rods 13.

The operating rod 7 is recessed at 14 and provided with a shaft $14^a$ on which is mounted two rods 15 and 16, their ends passing freely through openings in blocks 17 and 18 pivotally mounted in the carrier 10.

Springs 19 and 20 abut against collars 21 on the rods 15 and 16 and the other end of each spring rests against the blocks 17 or 18.

The device, when in the position of Figs. 1 to 4, in contact, due to the springs 19 and 20, carries the contact blade or blades to bear with pressure of the springs upon the terminal blocks.

When it is desired to break contact the springs are even more greatly compressed until they reach a dead center, when the slightest additional movement causes them to lift the contact blades and break the circuit. I find in practice that such dead center is only theoretical and that it is impossible to cause the switch blade to stop in such position.

This immediately destroys the "dead center" position and renders the springs 19 effective to send the carrier forthwith into the "off" position. The pressure of the springs 19 for urging the blocks 17 and 18 downwardly is somewhat increased when the pivot pin $14^a$ begins its downward movement, and as the downward movement progresses the compression of the springs imparts an increased downward pressure against the blocks until the "dead center" position is almost reached. This increased downward pressure is of course imparted to the switch blades and causes them to "give" or straighten out and thereby store up an added force until when the pivot pin $14^a$ has reached a point almost the "dead center" position this force is suddenly released to cause the pivot centers of the blocks to bound above the plane of the pivot pin. This immediately destroys the "dead center" position and renders the springs 19 effective to send the carrier forthwith into the "off" position. This is a very important advantage of the combination in that it insures a full, complete and positive operation of the device with every downward movement of the operating rod. Moreover, it enables the employment of a flat surface contact between the switch blades and the contact terminals. In this latter connection it should be noted that where a flat surface contact is employed and a "dead center" position of the springs is possible, then if at any time such a "dead center" position be assumed, as by not pressing down the rod sufficiently far, then the pressure of the springs to move the movable contact into engagement with the flat surfaces of the stationary contacts would be rendered *nil* and one or the other of the ends of the movable contact would probably move upwardly a slight distance away from its stationary contact. An arc would immediately ensue and the device probably be destroyed, perhaps causing much damage.

Figure 6:
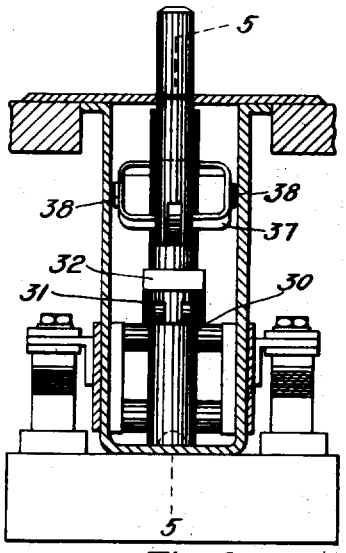
Fig. 6 is a section on line 6—6 Fig. 5.
Figure 5:
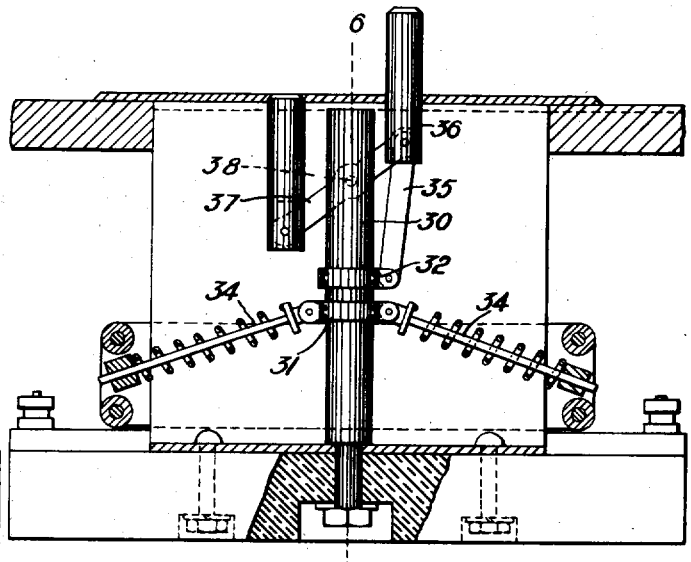
Fig. 5 is a sectional view of a push button switch on line 5—5 Fig. 6.

The switch of Figs. 5 and 6 is of the push button type. The terminals, blades, carrier, operating springs and their rods and blocks are as shown in the figures before described with relation to the pull type of switch, but the central reciprocating operating rod is replaced by a stationary post 30 on which two connected collars 31 and 32 are slidable. The collar 31 is secured to the rods 34 of the operating mechanism and the collar 32 to a link 35 secured to a push button 36. A rocker arm 37 pivoted at 38 to the post 30 is attached to the push button 38 so that the collars may by push button action be caused to move the rods 34 into and past dead center, as in the pull type heretofore described.

Figure 8:
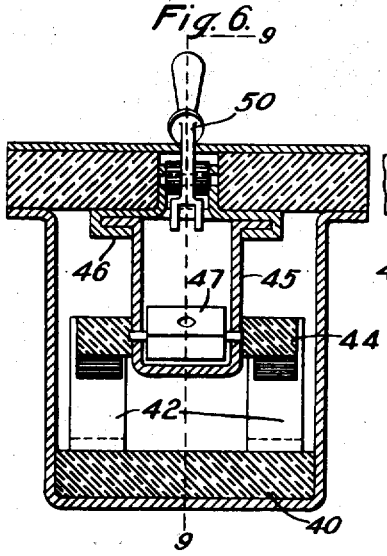
Fig. 8 is a section on line 8—8 Fig. 7.
Figure 7:
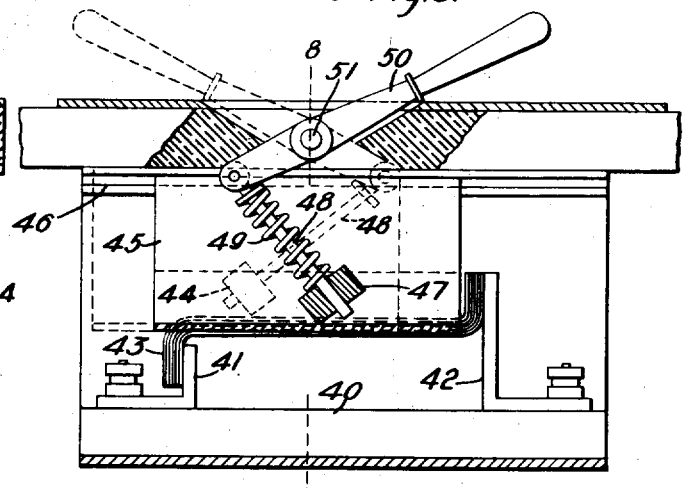
Fig. 7 is a section of a lever throw switch, on line 7—7, Fig. 8.

A lever type of switch is shown in Figs. 7 and 8.

To the base 40 upstanding terminals 41 and 42 are secured, inherently resilient switch blades 43 carried on insulating blocks 44 and of a general L shape are adapted to make contact as shown in Fig. 7.

The insulating blocks 44 are secured to a sliding carriage 45 sliding on guides 46.

A pivoted block 47 on the carriage 45 has a rod 48 passing through the center. The rod carries a spring 49 and is secured to one end of a lever 50 pivoted at 51 to the face of the switch.

In the position of Fig. 7 the spring 49 continually presses the contact blade against its terminals. Upon swinging the switch lever over to position indicated by dotted lines as soon as the rod passes a perpendicular position (dead center) the blade will be shot to the left and contact immediately broken.

Figure 9:
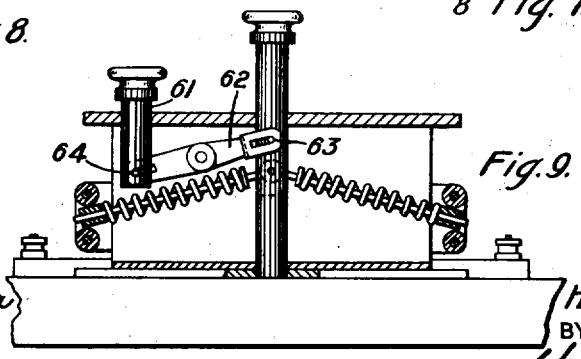
Fig. 9 is a view similar to Fig. 5 of a modified type of push button switch.

The switch shown in Fig. 9 varies but slightly from that of Figs. 1 to 4, the difference being in that the push and pull rod 60 can be operated by an auxiliary push button 61 instead of pulled out to make contact.

For this purpose a connecting rocker arm 62 is provided with slotted ends engaging pins 63 and 64 on the push button rods 60 and 61.

In carrying out this invention, details of construction may be varied from those shown, and yet the essence of the invention be retained; some parts might be employed without others, and new features thereof might be combined with elements old in the art in diverse ways, although the herein described type is regarded as embodying substantial improvements over such modifications.

As many changes could be made in the above construction, and many apparently widely different embodiments of the invention could be made without departing from the scope thereof, it is intended that all matter contained in the above description or shown in the accompanying drawings shall be interpreted in an illustrative and not in a limiting sense.

It is furthermore desired to be understood that the language used in the following claims is intended to cover all the generic and specific features of the invention herein described, and all statements of the scope of the invention which as a matter of language might be said to fall therebetween.

I claim as my invention:

1. In a switch mechanism, comprising a quick-break means for moving the switch blade away from a contact member, said quick-break means including a spring exerting a tendency to urge the switch blade against the contact, and said spring being movable through a dead-center position for reversing its effectiveness upon the switch blade to thereby break the switch blade away from the contact, the combination therewith of a flexible switch blade which is connected between the spring and the contact to receive pressure from the spring, and an operating member operable upon the spring to increase the pressure of the spring against the switch blade and thereby to flex the switch blade between the spring and the contact, said operating member being also adapted to move the spring through its dead-center position to relieve the pressure of the spring upon the switch blade and thereby to enable the stored energy in the switch blade to cause the switch blade to move in a direction away from the contact and thus to act as an auxiliary to the breaking action of the spring.

2. In a switch mechanism, a flexible switch blade movable toward and away from a relatively stationary contact member, a quick-break means for moving the switch blade away from the contact member, said quick-break means including a double spring toggle exerting a tendency to urge the switch blade against the contact, said toggle being movable through a dead-center position for reversing its effectiveness upon the switch blade to thereby break the switch blade away from the contact, a floating carrier upon which the switch blade is carried, said carrier having an opening therethrough within which the toggle operates, a guide member for the carrier also received in said opening, the flexible switch blade being mounted upon the carrier so as to receive pressure from the springs of the toggle through the carrier, and an operating member operable upon the toggle to increase the pressure of the springs thereof upon the carrier and thereby to flex the switch blade against the contact by pressure from the carrier, said operating member being also adapted to move the toggle through its dead-center position to relieve the pressure of the springs of the toggle upon the switch blade and thereby to enable the stored energy in the switch blade to cause the switch blade to move in a direction away from the contact and thus to act as an auxiliary to the breaking action of the toggle.

3. In a switch mechanism, comprising a floating carrier, a contact member supported by the carrier to move therewith, a standard, a member slidable upon said standard, a pair of spring devices connected between said member and said carrier comprising a double spring toggle of which said member is the knee joint, the double spring toggle being movable by said member through the dead-center position for exerting pressure to urge the carrier suddenly into "on" or "off" positions, an operating lever pivotally mounted intermediate its ends, link connections between said lever and said member to slide said member for operating said toggle in response to the swinging movements of said lever, and means whereby said lever may be swung in either direction at will.

4. In switch mechanism, the combination with a switch-blade carrier and a yieldable toggle means for yieldingly retaining the carrier in open and closed positions, of a flexible switch member mounted on the carrier and adapted to be flexed by the carrier when the latter is in closed position.

5. In a switch mechanism, the combination with a switch-blade carrier and a yieldable toggle means for yieldingly retaining the carrier in closed position and for withdrawing the carrier with a snap-action when the toggle is moved a predetermined distance, of a flexible switch member mounted upon the carrier and adapted to be flexed thereby when the carrier is in closed position.

In testimony whereof, I have hereunto subscribed my name this 24th day of March, 1919.

HUBERT F. KRANTZ.